United States Patent
Gole et al.

(10) Patent No.: US 7,467,169 B2
(45) Date of Patent: Dec. 16, 2008

(54) CIRCULAR AND BI-DIRECTIONAL MIRRORING OF FLEXIBLE VOLUMES

(75) Inventors: Abhijeet Gole, Cupertino, CA (US); Eric Hamilton, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 317 days.

(21) Appl. No.: 11/264,685

(22) Filed: Oct. 31, 2005

(65) Prior Publication Data

US 2007/0100910 A1    May 3, 2007

(51) Int. Cl.
G06F 12/00 (2006.01)
G06F 17/30 (2006.01)

(52) U.S. Cl. ................................ 707/204; 711/113
(58) Field of Classification Search ............... None
See application file for complete search history.

(56) References Cited

U.S. PATENT DOCUMENTS

| | | | |
|---|---|---|---|
| 5,568,629 A | 10/1996 | Gentry et al. | |
| 5,889,934 A | 3/1999 | Peterson | |
| 5,996,054 A * | 11/1999 | Ledain et al. | 711/203 |
| 6,021,408 A * | 2/2000 | Ledain et al. | 707/8 |
| 6,405,201 B1 * | 6/2002 | Nazari | 707/8 |
| 7,047,355 B2 * | 5/2006 | Nakatani et al. | 711/113 |
| 7,062,675 B1 * | 6/2006 | Kemeny et al. | 714/15 |
| 7,127,577 B2 | 10/2006 | Koning et al. | |
| 7,197,614 B2 * | 3/2007 | Nowakowski | 711/162 |
| 7,203,796 B1 * | 4/2007 | Muppalaneni et al. | 711/114 |
| 7,237,021 B2 | 6/2007 | Penny et al. | |
| 7,272,687 B2 * | 9/2007 | Balasubramanian | 711/114 |
| 2003/0212870 A1 | 11/2003 | Nowakowski | |
| 2004/0111557 A1 | 6/2004 | Nakatani et al. | |
| 2006/0224639 A1 * | 10/2006 | Watanabe et al. | 707/201 |

OTHER PUBLICATIONS

Network Appliance™ SnapMirror® Software, Global data availability and disaster recovery, Network Appliance, Inc., 2003.
Synchronous SnapMirror® Design and Implementation Guide, Christian D. Odhner, Darrin S. Chapman, Network Appliance Inc., Jun. 8, 2004.

* cited by examiner

Primary Examiner—Hosain T Alam
Assistant Examiner—Azam Cheema
(74) Attorney, Agent, or Firm—Weingarten, Schurgin, Gagnebin & Lebovici LLP (57) ABSTRACT

A method and system mirror flexible volumes in a circular or bi-directional configuration, without creating a deadlock. A source filer maintains a number of log files on a destination filer, where the number of log files is greater than or equal to the number of cache flush operations the primary filer performs between cache flush operations on the destination filer. The source filer can create the log files in advance. Alternatively or in addition, the source filer can create the log files as needed, i.e., the source filer can create a log file when the source filer flushes its cache. Once the destination filer flushes its cache, the log files created prior to the destination filer cache flush can be deallocated or reused.

18 Claims, 4 Drawing Sheets

CIRCULAR AND BI-DIRECTIONAL MIRRORING OF FLEXIBLE VOLUMES

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

The present invention relates to mirroring of storage devices (such as disks) in a network storage system and, more particularly, to circular or bi-directional mirroring of flexible volumes in a network storage system.

Computer workstations and application servers (collectively hereinafter referred to as "clients") frequently access data that is stored remotely from the clients. In these cases, computer networks are used to connect the clients to storage devices (such as disks) that store the data. For example, Information Systems (IS) departments frequently maintain "disk farms," tape backup facilities and optical and other storage devices (sometimes referred to as media) in one or more central locations and provide access to these storage devices via computer networks. This centralized storage (commonly referred to as "network storage") enables data stored on the storage devices to be shared by many clients scattered throughout an organization. Centralized network storage also enables the IS departments to store the data on highly reliable (sometimes redundant) equipment, so the data remains available, even in case of a catastrophic failure of one or more of the storage devices. Centralized data storage also facilitates making frequent backup copies of the data and providing access to backed-up data, when necessary.

Specialized computers (variously referred to as file servers, storage servers, storage appliances, etc., collectively hereinafter referred to as "filers") located in the central locations make the data on the storage devices available to the clients. Software in the filers and other software in the clients cooperate to make the central storage devices appear to users and application programs as though the storage devices were locally connected to the clients.

In addition, the filers can perform services that are not visible to the clients. For example, a filer can aggregate storage space in a set of storage devices and present all the space in the set of storage devices as a single "volume." Clients treat the volume as though it were a single, large disk. The clients issue input/output (I/O) commands to read or write data from or to the volume, and the filer accepts these I/O commands. The filer then issues I/O commands to the appropriate storage device(s) of the set to fetch or store the data. The filer then returns status information (and, in the case of a read command, data) to the client. Each block of the volume maps to a particular block of one of the storage devices and vice versa. Thus, a volume represents the storage capacity of a whole number of storage devices.

Some filers implement logical volumes (sometimes called "flexible" volumes). A flexible volume does not necessarily represent the storage capacity of a whole number of storage devices. Instead, the flexible volume generally represents a portion of the total storage capacity of the set of storage devices on which the flexible volume is implemented. A filer implements the flexible volume as a container file that is stored on the set of storage devices. When a client issues I/O commands to read or write data from or to the flexible volume, the filer accepts these I/O commands. The filer then issues I/O commands to the container file to fetch or store the data. The filer then returns status information (and, in the case of a read command, data) to the client.

Storage space on the set of storage devices is not necessarily pre-allocated for the container file. Blocks on the storage devices can be allocated to the container file as needed. Furthermore, as additional space is required on the flexible volume, the container file can be extended. Thus, unlike traditional volumes, each block of a flexible volume maps to a block of the container file, but a mapping between the blocks of the flexible volume and blocks on the storage devices does not necessarily occur until these blocks of the container file are written to the storage devices. Several container files can be stored on one set of storage devices. Thus, several distinct flexible volumes can be implemented on the same set, or an overlapping set, of storage devices.

"Volume mirroring" is another service provided by some filers. A volume mirror (sometimes referred to as a "destination volume") is an exact copy of another volume (sometimes referred to as a "source volume"). Typically, the source volume is connected to one filer (a "source filer") and the destination volume is connected to a different filer (a "destination filer"), and the two filers are connected to each other via a network. When a client writes data to the source volume, the source filer causes a copy of the data to be written to the destination volume. Because the source and destination volumes are mirror copies of each other, volume mirrors can be used to protect against a catastrophic failure of the source or destination volume or of either filer.

For performance reasons, when file write requests are received by a filer (regardless of whether volume mirroring is involved), the filer caches the write requests and occasionally flushes the cache by writing the cache's contents to the appropriate storage device(s). The cache contains data blocks that are to be written to the storage device(s). To enable the filer to continue accepting write requests from clients while the cache is being flushed, the filer divides the cache into two halves and alternates between the halves. That is, while one half of the cache is being flushed, the other half of the cache is used to store write requests, and vice versa.

The filer also stores information about write or modify operations that are to be performed in a battery backed-up non-volatile random access memory ("NVRAM"). This memory of write/modify operations and corresponding data is arranged in an ordered log of operations called an "NVLOG." Thus, if the filer experiences a catastrophic or power failure, upon recovery, the information in the NVLOG can be used to update the appropriate storage device(s), as though the cache had been flushed.

Volume mirroring is implemented by sending two streams of information from the source filer to the destination filer. The two streams correspond to the cache and to the NVRAM, respectively, on the source filer. The first stream is a stream of modified blocks that are to be written to the destination volume. The second stream is a log of write or modify operations that are to be performed on the destination volume. The first information stream contains much more data than the second information stream. Thus, the first information stream typically lags behind the second information stream.

The source filer directs the second stream of information to one of two log files on a storage device connected to the destination filer. The source filer alternates between the two log files, as the source filer alternates between the two halves of its cache. As with the NVRAM on the source filer, in case of a catastrophic or power failure involving the destination filer, the current log file can be used to update the destination volume, as though all the modified blocks had been written to the destination volume.

During a cache flush on the source filer, the source filer waits until the destination filer reports completion of the write operations involved in the two streams before the source filer considers its cache flush to be complete. This ensures that the destination volume is synchronized with the source volume.

However, if a volume is mirrored to a flexible volume, flushing the cache on a source filer can pose a problem. As noted, flexible volumes are implemented as container files. Therefore, write requests to flexible volumes are treated by the destination filer as ordinary file write operations to the container file, which are cached by the destination filer and reported to the source filer as being complete, before the data is actually written to the corresponding storage device(s). Because the destination filer treats both information streams from the source filer as ordinary file write requests, both streams are cached by the destination filer. The destination filer reports that the write operations involving the two information streams are complete as soon as the write operations are cached by the destination filer, i.e., before this information is actually written to the storage device(s).

Earlier, when the source filer began to flush its cache, the source filer switched to the other half of its cache and began writing to the other (second) log file on the destination filer. The next time the source filer flushes its cache, the source filer switches back to the first half of its cache and begins overwriting the first log file. The source filer assumes it is safe to reuse the first log file, because the source filer was informed that the write operations involving the two information streams were completed during the earlier cache flush. Thus, the source filer assumes the destination volume is synchronized with the source volume.

However, if the destination filer's cache is not flushed after the source filer's cache is flushed, the destination volume becomes unsynchronized with the source volume. That is, modified data blocks remain in the destination filer's cache, without having been written to the destination volume.

Furthermore, if the source filer flushes its cache a second time, the first log file begins to be overwritten. Thus, if the destination filer experiences a catastrophic or power failure, the log files do not contain enough information to update the destination volume.

To avoid this problem, a cache flush on the source filer is not deemed to be complete until the destination filer flushes its cache. However, this creates a dependency, i.e., the source filer's cache flush completion is dependent upon the destination filer's cache flush completion.

If the destination filer handles a source volume that is mirrored on the source filer, (i.e., each filer mirrors a volume that is sourced from the other filer (a situation known as "bi-directional mirroring"), completion of each filer's cache flush depends upon completion of the other filer's cache flush. This, of course, creates a deadlock, because, to flush its cache, each filer must wait until the other filer flushes its cache. Similarly, if filer A mirrors a volume on filer B, and filer B mirrors another volume on filer C, and filer C mirrors yet another volume on filer A, this "circular mirroring" creates a deadlock.

BRIEF SUMMARY OF THE INVENTION

Disclosed is a method and system for mirroring flexible volumes in a circular or bi-directional configuration, without creating a deadlock. A source filer maintains a number of log files on the destination filer, where the number of log files is greater than or equal to the number of cache flush operations the source filer performs between cache flush operations on the destination filer. The source filer can create the log files in advance. Alternatively or in addition, the source filer can create the log files as needed, i.e., the source filer can create a log file when the source filer flushes its cache. Once the destination filer flushes its cache, the log files created prior to the destination filer cache flush can be deallocated or reused.

These and other features, advantages, aspects and embodiments of the present invention will become more apparent to those skilled in the art from the Detailed Description Of The Invention that follows.

BRIEF DESCRIPTION OF THE SEVERAL VIEWS OF THE DRAWINGS

The invention will be more fully understood by referring to the Detailed Description Of The Invention in conjunction with the Drawings, of which.

DETAILED DESCRIPTION OF THE INVENTION

Disclosed is a method and system for mirroring flexible volumes in a circular or bi-directional configuration, without creating a deadlock. A source filer maintains a number of log files on the destination filer, where the number of log files is greater than or equal to the number of cache flush operations the source filer performs between cache flush operations on the destination filer. The source filer can create the log files in advance. Alternatively or in addition, the source filer can create the log files as needed, i.e., the source filer can create a log file when the source filer flushes its cache. Once the destination filer flushes its cache, the log files created prior to the destination filer cache flush can be deallocated or reused.

Figure 1:
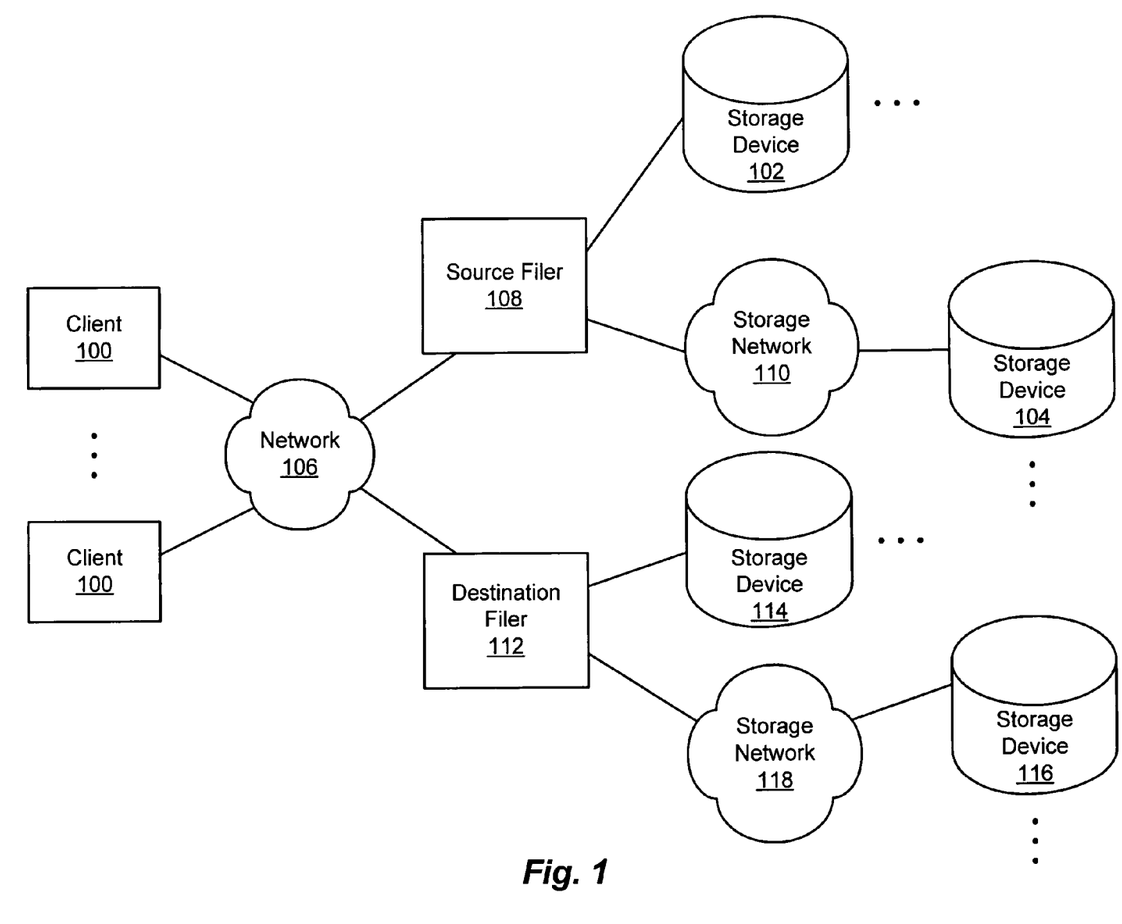
FIG. 1 is a block diagram of an exemplary network storage system, in which the presently disclosed system and method can be used.

As noted, workstations and application servers (collectively "clients") are frequently connected to filers and/or storage devices via local or wide area networks (LANs or WANs) and/or storage networks. FIG. 1 is a block diagram of an exemplary network storage system in which the presently disclosed mirroring system and method can be used. Clients 100 are connected to one or more storage devices 102 and/or 104 via a packet-switched (such as in Internet Protocol (IP)) network 106 and a source filer 108. Storage device 102 is directly connected to the source filer 108, whereas storage device 104 is connected to the source filer 108 via a storage network 110. Although only one storage device is shown at each of 102 and 104, other numbers of storage devices can be used.

A destination filer 112 has one more directly connected storage devices 114, and/or as one more other storage devices 116 connected to the destination filer 112 via a storage network 118. Other numbers of clients 100, filers 108 and 112 and storage devices 102, 104, 114 and 116, can, of course, be used.

The filers 108 and 112 can communicate with each other, such as via the network 106 or via another network (not shown). Fiber Channel or other technology can be used to implement the storage networks 110 and 118, as is well known in the art. Internet SCSI (iSCSI) or other network technology can be used to communicate between the clients 100 and the filer 108, as is well known in the art.

For purposes of presenting an exemplary implementation that can support circular or bi-directional mirroring that involves a flexible volume, assume that the destination filer 112 implements a flexible volume on the one or more storage devices 114 and 116. Suitable software to support flexible volumes is available from Network Appliance, Inc. of Sunnyvale, Calif. under the trade name FlexVol.

In addition, assume that the source filer 108 implements a mirrored volume. In particular, the source filer 108 implements the mirrored volume (i.e., the source volume) on the one or more storage devices 102 and/or 104. Assume further that the source filer 108 communicates with the destination filer 112, over the network 106 and the destination filer 112 maintains a synchronous mirror copy of the source volume (i.e., the destination volume) on the flexible volume. A suitable system for maintaining a synchronous mirror copy of the source volume is described in commonly assigned U.S. patent application Ser. No. 10/692,495, filed Oct. 24, 2003, titled "Synchronous Mirroring Including Writing Image Updates To A File," the contents of which are hereby incorporated by reference herein.

Figure 2:
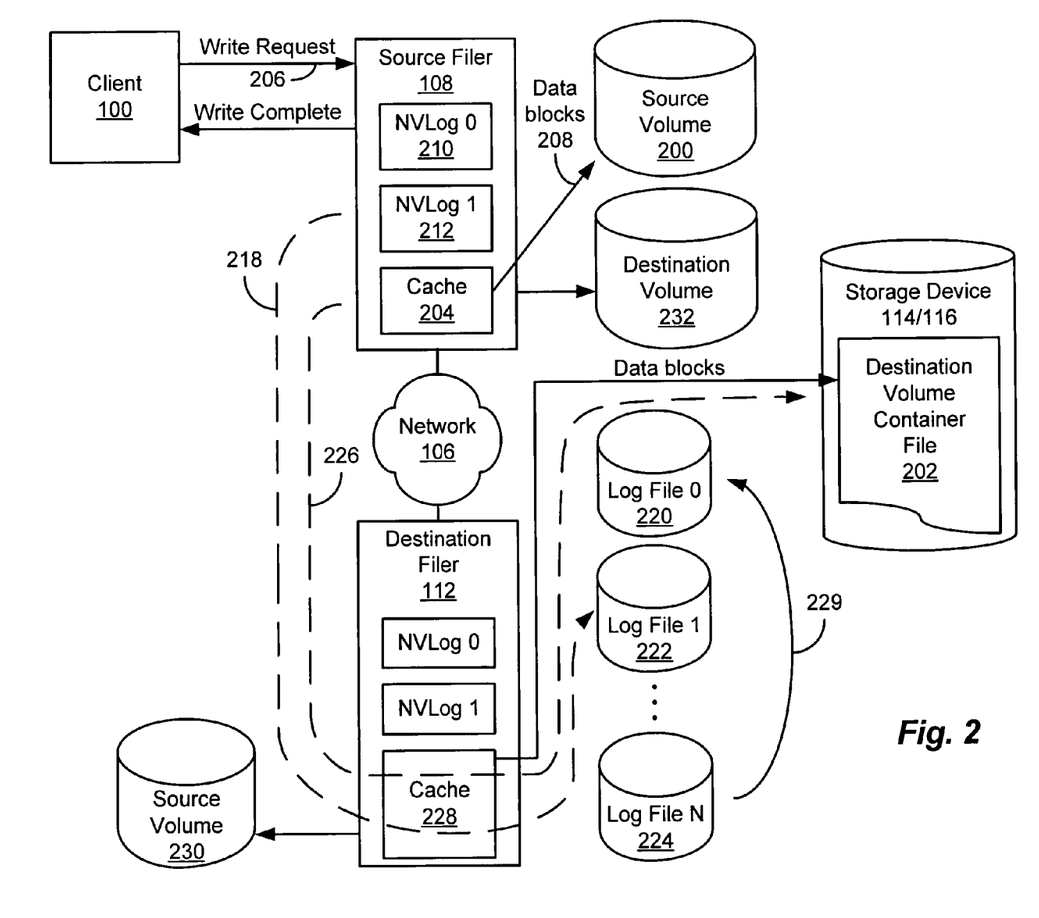
FIG. 2 is a schematic diagram of mirroring data on a flexible volume, according to one embodiment of the present invention.

An exemplary arrangement involving mirroring on a flexible volume is depicted schematically in FIG. 2. As noted, the source filer 108 maintains a source volume 200, and the destination filer 112 maintains a destination volume. Because the destination volume is implemented in a flexible volume, the destination volume is implemented as a container file 202 on one more of the storage devices 114 and/or 116.

The source filer 108 includes a cache 204. Write or modify requests 206 (collectively hereinafter referred to as "write requests") from a client 100 are stored in the cache 204 until the source filer 108 flushes the cache 204 by writing data blocks to the source volume 200, as indicated at 208. Until the cache 204 is flushed, the source filer 108 stores information about write or modify operations that are to be performed on the source volume 200. The filer 108 stores this information in one of two non-volatile memories 210 and 212 (referred to as NVLog0 and NVLog1). The filer 108 alternates between the two memories 210 and 212 each time the filer flushes its cache 204.

In addition to writing this information into one of the two memories 210 and 212, the source filer 108 writes (as indicated by dashed line 218) the information into a log file on a storage device maintained by the destination filer 112. Several exemplary log files 220, 222 and 224 are shown in FIG. 2. Each time the source filer 108 flushes its cache 204, the source filer 108 begins writing this information to a different one of the log files 220-224.

When the source filer 108 flushes its cache 204, in addition to writing the data blocks 208 to the source volume 200, the source filer 108 writes (as indicated by dashed line 226) the contents of the cache 204 to the destination volume (which is implemented as a container file 202). Because the destination volume is implemented by the destination filer as a container file 202, write requests to the container file 202 are stored in a cache 228, until the destination filer 212 flushes the cache 228.

Once the destination filer 112 flushes its cache 228, the log files that were created prior to flushing the cache can be deallocated or reused. Thus, the log files 220-224 can form a ring buffer of log files, in which the oldest unused log file is reused next, as indicated by arrow 229. The log files 220-224 can, however, be reused in any order. The number of required log files 220-224 depends on the number of times the cache 204 on the source filer 108 is flushed, compared to the number of times the cache 228 on the destination filer 112 is flushed.

The log files 220-224 can be pre-allocated. The number of pre-allocated log files 220-224 can be chosen based on the expected ratio of cache flushes on the source file a 108 to cache flushes on the destination filer 112. Alternatively, an arbitrary number, such as four, of log files 220-224 can be created. In either case, additional log files (not shown) can be created as needed. For example, if the source filer 108 has flushed its cache 204 as many times as there are log files 220-224, and the source filer 108 needs to flushed its cache 204 again, an additional log file can be created.

Unused log files 220-224 can be kept for reuse or deallocated. In one embodiment, the disclosed system maintains at least a predetermined number, such as four, of unused log files 220-224. If the source filer 108 flushes its cache 204 frequently enough to use the available log files 220-224 and leaves fewer than the predetermined number of log files available, the system allocates additional log files. On the other hand, if the source filer 108 flushes its cache 204 less frequently, and more than a predetermined number, such as eight, of unused log files remains unused for a predetermined amount of time, such as five minutes, the additional unused log files (beyond four unused log files) are deallocated. Thus, the system can dynamically adjust the number of log files 220-224 to match the relative rate of cache flushing by the source filer 108 and the destination filer 112.

Maintaining a number of log files 220-224 on the destination filer 112, where the number of log files 220-224 is greater than or equal to the number of cache flush operations the primary filer 108 performs between cache flush operations performed by the destination filer 112, avoids a dependency of the source filer 108 on the destination filer 112. In particular, cache flushes on the source filer 108 are not dependent upon completion of cache flushes on the destination filer 112. Thus, the destination filer 112 can maintain a source volume, such as source volume 230, and the source filer 108 can maintained a mirror copy (i.e., a destination volume 232) of the source volume 230 in a flexible volume, without incurring a deadlock. Similarly, a circular chain of filers (not shown) can maintained a set of source volumes and mirrored destination volumes on flexible volumes, without incurring a deadlock.

Figure 3A:
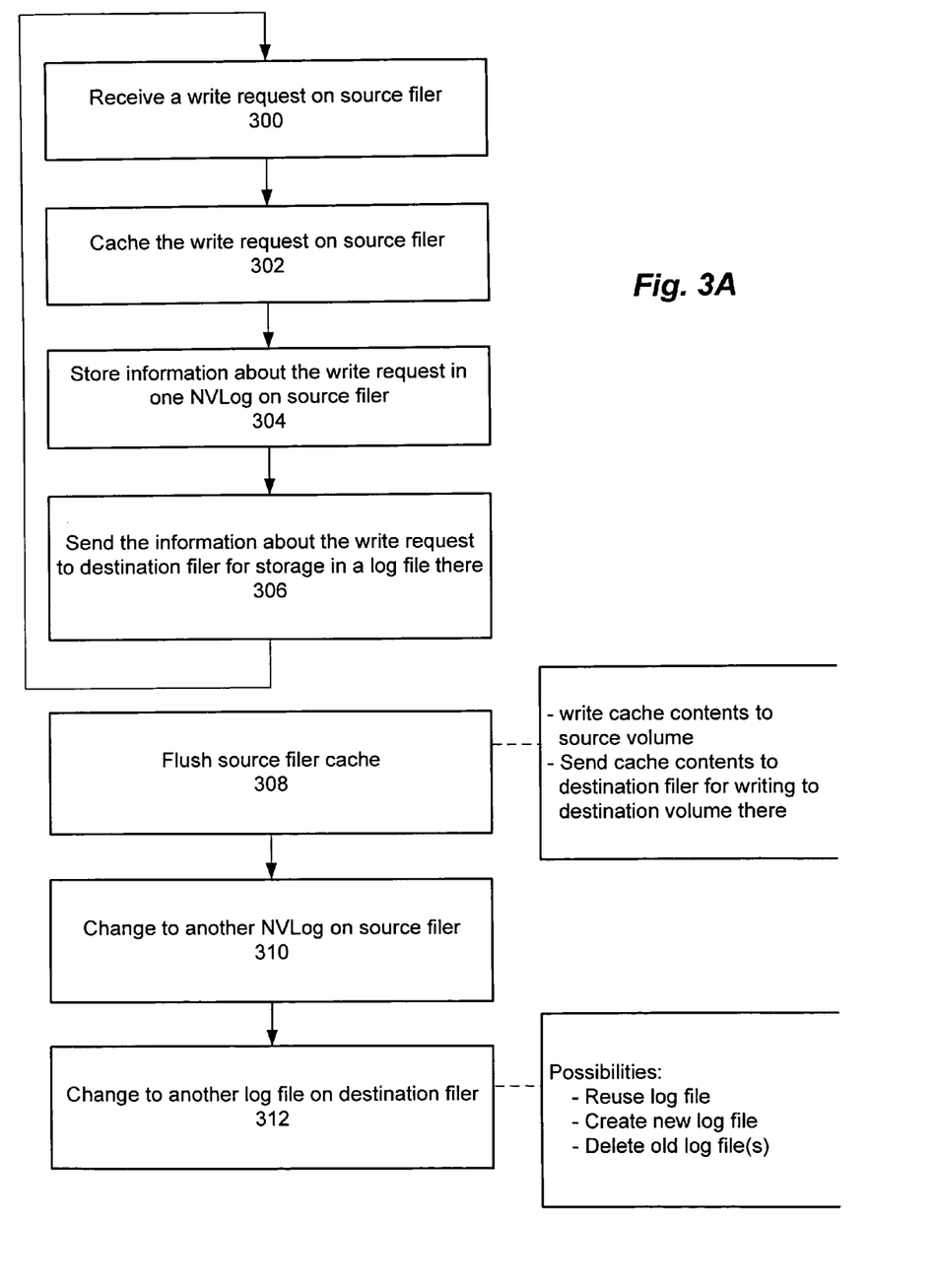
FIGS. 3A and 3B contain a flowchart depicting operation of one embodiment of the present invention.
Figure 3B:
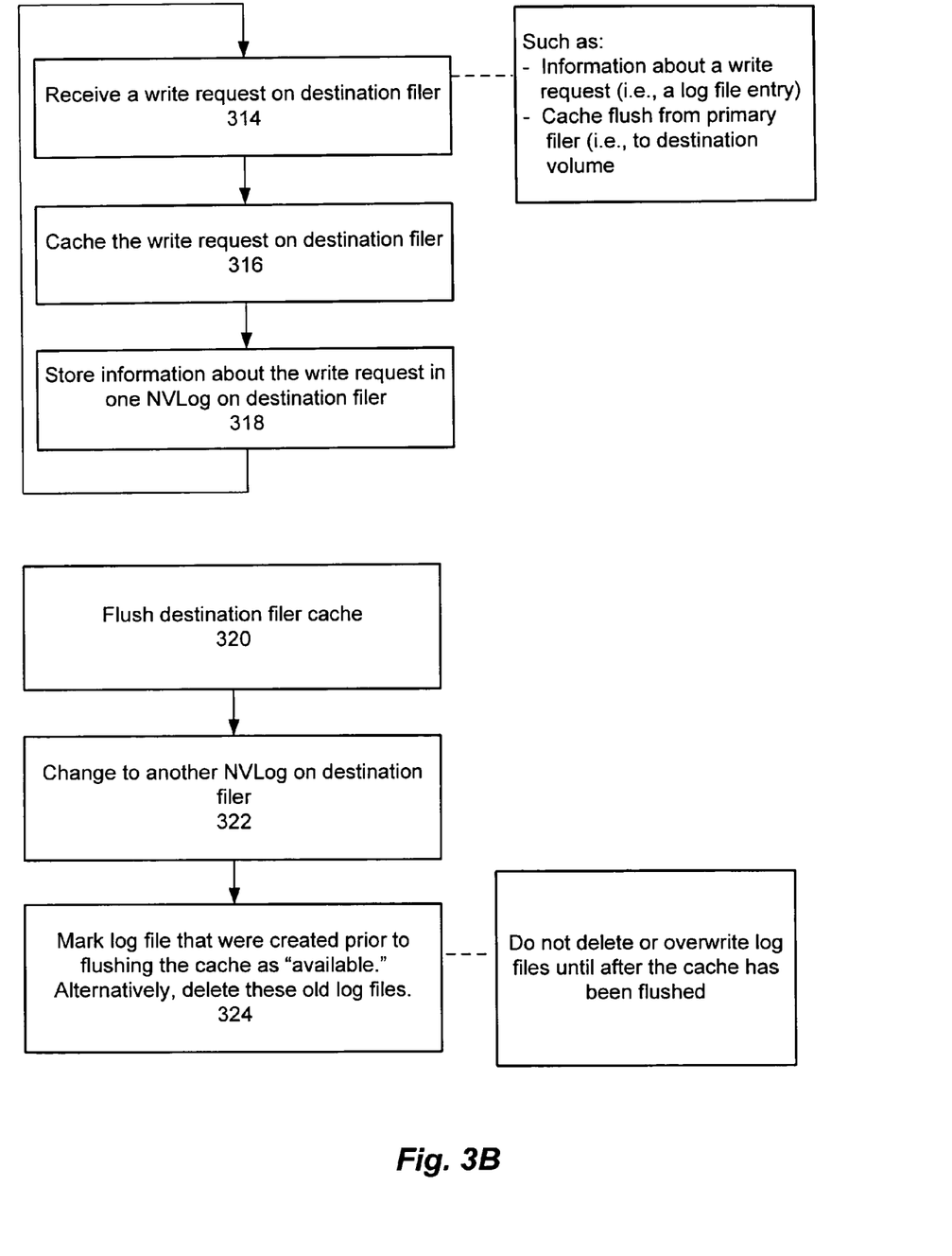

Operation of the disclosed method and system is also shown with reference to a flowchart shown in FIGS. 3A and 3B. At 300, a source filer receives a write request. The source filer caches the write request (such as in the cache 204 in FIG. 2) at 302. As noted, the source filer also maintains two non-volatile memories (NVLogs 210 and 212) (FIG. 2). At 304, the source filer writes information about the write request into one of the non-volatile memories. At 306, the source filer also sends the information about the write request to the destination filer for storage there in a log file. Control then returns to 300 to receive another write request.

Periodically or occasionally, the cache on the source filer is flushed. At 308, the source filer flushes its cache. Flushing the cache includes writing the contents of the cache to the source volume and sending the cache contents to the destination filer for writing to the destination volume, as discussed above. When the source filer flushes its cache, at 310, the source filer changes to the other NVLog (non-volatile memory). Thus, information about subsequently received write requests will be stored (at 304) in the other NVLog. If two NVLogs are used, as described above, the source filer alternates between the two NVLogs each time the source filer's cache is flushed.

Also each time the source filer's cache is flushed, at 312 the source filer changes to another log file on the destination filer.

However, as discussed above, there can be more than two log files on the destination filer. If necessary, a new log file can be created, as discussed above. Alternatively or in addition, if one or more old log files are available, one of these old log files can be reused.

At 314, a destination filer receives a write request. The write request can contain information about a write request on the source filer, i.e., a log file entry. (Such requests are generated at 318.) Alternatively, the write request can contain cache information from the source filer that was sent as a result of the source filer flushing its cache at 308. Of course, the write request need not originate at the source filer, i.e., a client might have initiated the write request independent of the operation being described here.

At 316, the destination filer caches the write request, such as in the cache 228 in FIG. 2). At 318, the destination filer stores information about the write request in one of the destination filer's NVLogs. Control then returns to 314 to await the next write request to the destination filer.

Periodically or occasionally, the destination filer flushes its cache. The destination filer flushes its cache at 320 and, at 322, the destination filer changes to using another of its NVLogs. After flushing the cache on the destination filer, log file(s) that were created prior to flushing the cache are marked "available." The available log files can be reused at 312. Alternatively, some or all of the log files that were created prior to flushing the cache are deleted. However, log files that were created after the cache is flushed are not marked "available," deleted or overwritten until after the cache is subsequently flushed.

The functions describe herein can be performed by processors executing instructions stored in memories in the source and destination filers 108 and 112.

The filers 108 and 112 include host bus adapters or other network or fabric interfaces. In some embodiments, these interfaces convert (translate) messages (packets, etc.) received over the network 106 or over the Internet (not shown) according to a variety of protocols into messages according to a common message format for processing by an operating system or other control software. The interfaces also convert messages from the operating system according to the common message format into messages according to the appropriate protocol for transmission over the network 106 or the Internet. An exemplary operating system is Data ONTAP, available from Network Appliance, Inc. of Sunnyvale, Calif. However, any suitable operating system that is capable of receiving and translating data from multiple protocols is acceptable.

The interfaces and the storage devices 102 and 114 (if present) are controlled by CPUs executing the operating system, control software or other instructions stored in a memory to perform at least some of the functions described herein.

The clients 100 may be general-purpose computers configured to execute applications under the control of a variety of operating systems, including the UNIX® and Microsoft® Windows® operating systems. These computers may utilize file-based or block-based access protocols when accessing information in a storage system over a Network Attached Storage (NAS-based) or Storage Area Network (SAN-based) network, respectively. Therefore, each computer may request the services of the storage system by issuing access protocol messages (in the form of packets) to the storage system over the network. For example, a computer running the Windows operating system may communicate with the storage system using the Common Internet File System (CIFS) protocol over TCP/IP. On the other hand, a computer running the UNIX operating system may communicate with the storage system using the Network File System (NFS) protocol over TCP/IP. It will be apparent to those skilled in the art that other computers running other types of operating systems may also communicate with the storage system, also known as a multi-protocol filer, using other file access protocols. As noted, messages received by the storage system according to various protocols from various clients are translated for execution by an operating system of the storage system.

A system and method for mirroring flexible volumes has been described as comprising computer instructions that can be stored in a memory and executed by a processor. Those skilled in the art should readily appreciate that instructions or programs defining the functions of the present invention can be delivered to a processor in many forms, including, but not limited to, information permanently stored on non-writable storage media (e.g. read only memory devices within a computer such as ROM or CD-ROM disks readable by a computer I/O attachment), information alterably stored on writable storage media (e.g. floppy disks and hard drives) or information conveyed to a computer through communication media. In addition, while the invention may be embodied in software, the functions necessary to implement the invention may alternatively be embodied in part or in whole using software, firmware and/or hardware components, such as combinatorial logic, application-specific integrated circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A method of mirroring data, comprising the steps of: in a first receiving step, receiving, at least one data write request at a source storage server;

storing, in a first cache on said source storage server, said at least one data write request received in said first receiving step;

writing, by said source storage server into at least one first log file of a plurality of log files on a destination storage server, information about said at least one data write request received in said first receiving step;

in at least one cache flush operation performed on said source storage server, flushing said first cache on said source storage server, and, responsive to receiving at least one next data write request at said source storage server, beginning to write information about said at least one next data write request into at least one second log file of said plurality of log files on said destination storage server by said source storage server, wherein, each time said first cache is flushed, said source storage server begins writing information about at least one next data write request to a different one of said plurality of log files on said destination storage server;

in a second receiving step, receiving at least one data write request at said destination storage server;

storing, in a second cache on said destination storage server, said at least one data write request received in said second receiving step;

in at least one cache flush operation performed on said destination storage server, flushing said second cache on said destination storage server; and responsive to said flushing of said second cache, performing one of deallocating and overwriting said at least one first log file, wherein a total number of said plurality of log files on said destination storage server is greater than or equal to a number of cache flush operations performed on said source storage server between cache flush operations performed on said destination storage server.

2. The method of claim 1, further comprising pre-allocating at least three log files on said destination storage server.

3. The method of claim 1, wherein flushing the first cache on said source storage server comprises allocating an additional log file on said destination storage server.

4. The method of claim 1, further comprising:

calculating a desired number of log files, based on a number of times the first cache on the source storage server is flushed and on a number of times the second cache on the destination storage server is flushed; and if the calculated desired number of log files is less than the total number of said plurality of log files on said destination storage server, deleting at least one of the plurality log files on said destination storage server.

5. The method of claim 1, further comprising:

calculating a desired number of log files, based on a number of times the first cache on the source storage server is flushed and on a number of times the second cache on the destination storage server is flushed; and if the calculated desired number of log files is greater than the total number of said plurality of log files on said destination storage server, creating at least one additional log file on said destination storage server.

6. The method of claim 1, further comprising, after receiving the at least one data write request in said first receiving step, storing information about the at least one data write request in a non-volatile memory.

7. A method of mirroring data, comprising the steps of:

in a first receiving step, receiving, at least one data write request at a source storage server;

storing, in a first cache on said source storage server, said at least one data write request received in said first receiving step;

writing, by said source storage server into at least one first log file of a plurality of log files on a destination storage server, information about said at least one data write request received in said first receiving step;

in at least one cache flush operation performed on said source storage server, flushing said first cache on said source storage server, and, responsive to receiving at least one next data write request at said source storage server, beginning to write information about said at least one next data write request into at least one second log file of said plurality of log files on said destination storage server by said source storage server, wherein, each time said first cache is flushed, said source storage server begins writing information about at least one next data write request to a different one of said plurality of log files on said destination storage server;

in a second receiving step, receiving at least one data write request at said destination storage server;

storing, in a second cache on said destination storage server, said at least one data write request received in said second receiving step;

in at least one cache flush operation performed on said destination storage server, flushing said second cache on said destination storage server; and responsive to said flushing of said second cache, de allocating said at least one first log file, wherein a total number of said plurality of log files on said destination storage server is greater than or equal to a number of cache flush operations performed on said source storage server between cache flush operations performed on said destination storage server.

8. The method of claim 7, further comprising, after said second cache is flushed, beginning to write information about yet subsequently received data write requests on another log file.

9. The method of claim 8, wherein beginning to write information about yet subsequently received data write requests comprises allocating the another log file.

10. A system for mirroring data, comprising:

a source storage server including a first cache; and a destination storage server including a second cache, said destination storage server being operative to maintain a plurality of log files including at least one first log file and at least one second log file, wherein said source storage server is operative:

to receive at least one first data write request;

to store the at least one first data write request in the first cache;

to write information about the at least one first data write request into the at least one first log file maintained on said destination storage server; and in at least one cache flush operation, to flush the first cache, and, responsive to receiving at least one next data write request at said source storage server, to begin to write information about said at least one next data write request into the at least one second log file maintained on said destination storage server, wherein, each time the first cache is flushed, said source storage server is operative to begin writing information about at least one next data write request to a different one of said plurality of log files on said destination storage server, wherein said destination storage server is operative:

to receive at least one second data write request;

to store the at least one second data write request in the second cache;

in at least one cache flush operation, to flush the second cache, and responsive to said flushing of said second cache, to perform one of de allocating and overwriting the at least one first log file, wherein a total number of said plurality of log files on said destination storage server is greater than or equal to a number of cache flush operations performed by said source storage server between cache flush operations performed by said destination storage server.

11. The system of claim 10, wherein said destination storage server is further operative to maintain a third log file.

12. The system of claim 10, wherein said source storage server is further operative to allocate an additional log file on said destination storage server.

13. The system of claim 10, wherein said source storage server is further operative to calculate a desired number of log files, based on a number of times the first cache on said source storage server is flushed and on a number of times the second cache on said destination storage server is flushed.

14. The system of claim 13, wherein said source storage server is operative, if the calculated desired number of log files is less than the total number of said plurality of log files maintained on said destination storage server, to delete at least one of the plurality of log files maintained on said destination storage server.

15. The system of claim 13, wherein said source storage server is operative, if the calculated desired number of log files is greater than the total number of said plurality of log files maintained on said destination storage server, to create at least one additional log file on said destination storage server.

16. The system of claim 10, wherein said source storage server is further operative, after the second cache on said destination storage server is flushed, to begin to write information about yet subsequently received write requests on another log file.

17. The system of claim 16, wherein said source storage server is further operative, after the second cache on said destination storage server is flushed, to allocate the another log file before beginning to write information about the subsequently received write requests on the another log file.

18. The system of claim 10, wherein said source storage server comprises a non-volatile memory, and wherein said source storage server is further operative, after receiving the at least one first data write request, to store information about the at least one first data write request in the non-volatile memory.

* * * * *